United States Patent
McHale et al.

(10) Patent No.: US 11,527,119 B2
(45) Date of Patent: Dec. 13, 2022

(54) SYSTEM AND METHOD FOR SECURELY RECEIVING AND STORING DELIVERIES

(71) Applicant: Walmart Apollo, LLC, Bentonville, AR (US)

(72) Inventors: Brian G. McHale, Oldham (GB); John J. O'Brien, Farmington, AR (US); Robert Cantrell, Herndon, VA (US); Jennifer Hedges, Lowell, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/488,736

(22) Filed: Sep. 29, 2021

(65) Prior Publication Data
US 2022/0020233 A1 Jan. 20, 2022

Related U.S. Application Data

(63) Continuation of application No. 16/286,911, filed on Feb. 27, 2019, now abandoned.
(Continued)

(51) Int. Cl.
*G07C 9/00* (2020.01)
*G06Q 10/08* (2012.01)
(Continued)

(52) U.S. Cl.
CPC ......... *G07C 9/0069* (2013.01); *G05B 19/042* (2013.01); *G05D 23/1917* (2013.01);
(Continued)

(58) Field of Classification Search
CPC ........ G05B 19/042; G05B 2219/23051; G05B 2219/2637; G05D 23/1917; G06Q 10/0832; G06Q 10/0836; G07C 2009/0092
See application file for complete search history.

(56) References Cited

U.S. PATENT DOCUMENTS 5,323,782 A * 6/1994 Shirasaki ............. A61B 5/0225 600/494
6,323,782 B1 11/2001 Stephens et al.
(Continued)

FOREIGN PATENT DOCUMENTS

WO 2012022398 A1 2/2012

OTHER PUBLICATIONS

PCT International Search Report and Written Opinion dated Apr. 30, 2019, issued in corresponding PCT Application No. PCT/US2019/019802.

*Primary Examiner* — Thomas D Alunkal
(74) *Attorney, Agent, or Firm* — Morgan, Lewis & Bockius LLP; Manita Rawat

(57) ABSTRACT

Systems and methods for a storage unit are disclosed. A storage unit includes a container defining an interior storage space and an opening configured to provide access to the interior storage space, a door configured to open and close the opening, a heating/cooling mechanism configured to adjust a temperature in the interior storage space, a temperature sensor configured to monitor the temperature in the interior storage space. A control unit is configured to receive the temperature in the interior storage space, receive a required temperature of an item in the storage unit, receive a signal indicative of a distance of a delivery vehicle, and activate the heating/cooling mechanism based on the temperature, the required temperature, and the distance of the delivery vehicle. The heating/cooling mechanism is activated at a time configured to achieve the required temperature within the interior storage space when the delivery vehicle arrives at the storage unit.

20 Claims, 7 Drawing Sheets

Related U.S. Application Data

(60) Provisional application No. 62/636,789, filed on Feb. 28, 2018.

(51) Int. Cl.
*G05B 19/042* (2006.01)
*G05D 23/19* (2006.01)

(52) U.S. Cl.
CPC ..... *G06Q 10/0832* (2013.01); *G06Q 10/0836* (2013.01); *G05B 2219/23051* (2013.01); *G05B 2219/2637* (2013.01); *G07C 2009/0092* (2013.01)

(56) References Cited

U.S. PATENT DOCUMENTS

| | | | |
|---|---|---|---|
| 6,344,796 B1* | 2/2002 | Ogilvie | G07C 9/27 340/568.1 |
| 9,211,025 B1* | 12/2015 | Elhawwashy | A47G 29/20 |
| 2010/0138666 A1 | 6/2010 | Adams et al. | |
| 2011/0220176 A1* | 9/2011 | Halpern | F24S 20/50 136/246 |
| 2015/0120602 A1 | 4/2015 | Huffman et al. | |
| 2015/0183528 A1* | 7/2015 | Walsh | A47G 29/14 244/114 R |
| 2015/0339872 A1 | 11/2015 | de Puiseau | |
| 2016/0101874 A1* | 4/2016 | McKinnon | A47G 29/14 244/114 R |
| 2016/0159496 A1* | 6/2016 | O'Toole | B64C 39/024 244/110 E |
| 2016/0371642 A1* | 12/2016 | Wilkinson | G06Q 10/0832 |
| 2017/0228692 A1 | 8/2017 | Pargoe | |
| 2017/0255896 A1 | 9/2017 | Van Dyke | |
| 2017/0286905 A1 | 10/2017 | Richardson et al. | |
| 2018/0105289 A1* | 4/2018 | Walsh | A47G 29/141 |

* cited by examiner

SYSTEM AND METHOD FOR SECURELY RECEIVING AND STORING DELIVERIES

CROSS-REFERENCE TO RELATED APPLICATIONS

This application is a continuation of U.S. patent application Ser. No. 16/286,911, filed on Feb. 27, 2019, entitled "System and Method for Securely Receiving and Storing Deliveries," which claims the benefit of U.S. Provisional Patent Application No. 62/636,789, filed Feb. 28, 2018, each of which is incorporated herein by reference in its respective entirety.

TECHNICAL FIELD

The present disclosure relates to a storage unit and more specifically to receiving and securely storing delivered goods until they can be retrieved by the intended recipient.

BACKGROUND

Customers are increasingly choosing to purchase food, drugs, and goods online. But insuring that the deliveries are received by the intended recipient in the intended condition has presented a challenge for retailers. Many deliveries must be made when the recipient is not home, which leaves the contents of the delivery vulnerable to theft or tampering. Additional precautions must be taken to protect perishable items which may spoil if kept at the wrong temperature, and these type of items may be particularly attractive to wildlife. Food delivery services have used expensive cooling devices to keep perishable items at the intended temperature. Some retailers have used disposable coolers or cooling packs which results in cost and waste. To address this problem other retailers have used more expensive coolers that their customers must return upon removing their delivery, which requires additional coordination between the retailer and recipient and additional transportation.

To address the problem of theft of delivered packages, customers have resorted to expensive video home monitoring systems. Other devices have been put into place to allow delivery people to enter residences to deliver packages for later retrieval by the intended recipient. However, many customers are uncomfortable with delivery people entering their home or building.

In addition to the cost and labor necessary to preserve and secure deliveries, many of these methods are not desirable because they are incompatible with delivery by unmanned vehicles such as unmanned aerial vehicles (UAVs) or autonomous or remotely controlled land or water vehicles. The use of UAVs to deliver packages with food, drugs, or goods offers many benefits over traditional package delivery. UAVs offer large retailers the ability to deliver packages on-demand with increased automation, minimizing the amount of human capital expenditures and decreasing the impact on the environment that may result from traditional ground transportation.

But UAVs may not have the capability to alert package recipients of a delivery like the traditional knock-on-the-door of a delivery person. Additionally, it may be preferable for UAVs to deliver packages a certain distance away from the intended delivery location. For example, it may not be desirable for a UAV to enter a residential property because of pets or children on the property who may be startled by the UAV or may intentionally or innocuously tamper with the UAV The secure storage of packages in a temperature controlled environment is therefore a significant problem for many retailers. It is advantageous to have a storage unit that allows access to designated persons or devices, such as by the delivery person or vehicle and the recipient.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In one embodiment, a storage unit is disclosed. The storage unit includes a container defining an interior storage space and an opening configured to provide access to the interior storage space, a door configured to open and close the opening, a heating/cooling mechanism configured to adjust a temperature in the interior storage space, a temperature sensor configured to monitor the temperature in the interior storage space, and a control unit. The control unit is configured to receive the temperature in the interior storage space, receive a required temperature of an item in the storage unit, receive a signal indicative of a distance of a delivery vehicle, and activate the heating/cooling mechanism based on the temperature, the required temperature, and the distance of the delivery vehicle. The heating/cooling mechanism is activated at a time configured to achieve the required temperature within the interior storage space when the delivery vehicle arrives at the storage unit.

In various embodiments, a method is disclosed. The method includes steps of receiving, by a control unit, a temperature of an interior storage space of a storage unit, receiving, by the control unit, a required temperature of an item to be located in the storage unit, receiving, by the control unit, a signal indicative of a distance of a delivery vehicle carrying the item, and activating a heating or refrigeration mechanism based on the temperature, the required temperature, and the distance of the delivery vehicle. The heating or refrigeration mechanism is activated at a time configured to achieve the required temperature within the interior storage space when the delivery vehicle arrives at the storage unit.

In various embodiments, a system is disclosed. The system includes at least one unmanned aerial vehicle (UAV) configured to deliver one or more items to one or more locations, a storage unit at a first location configured to receive at least one of the one or more items, and a control unit. The control unit is configured to determine a distance of the UAV to the storage unit, activate a temperature control mechanism based on the distance of the UAV to the storage unit, and provide access to the storage unit in response to input from an intended recipient. The temperature control mechanism is activated at a time configured to achieve a predetermined temperature within the interior storage space when the UAV arrives at the storage unit.

DETAILED DESCRIPTION

Figure 1:
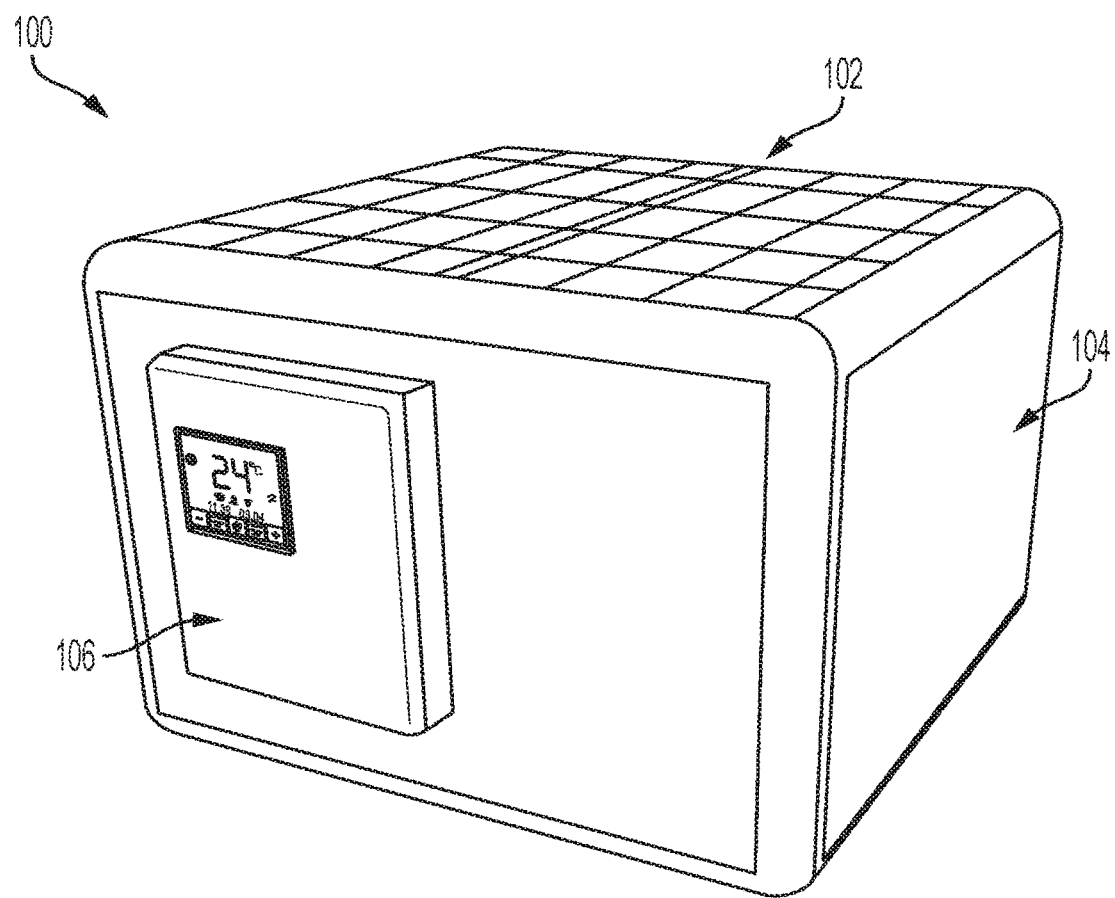
FIG. 1 is an illustration of a storage unit.

A storage unit may take the form of container with controlled access. Access may be controlled by any of the methods known in the art, for example, the storage unit may have two doors that open automatically upon receiving an open command. The command may be a code that is entered or a signal sent by a device such as a UAV or mobile phone. The storage unit may also have a GPS locator for emitting and receiving location information. In one embodiment, this information may be used to communicate with a delivery vehicle, such as a UAV, so that the vehicle can navigate itself to the storage unit. In other embodiments, delivery may be made by a person with information about the location of the storage unit, for example, the street address of the property where the storage unit is located. The delivery unit may be securely attached to the property. The storage unit may have a locking mechanism that may be opened by a physical key, a code, or signal emitted from a mobile device such as a cell phone. Unlike devices that allow the delivery in the business or dwelling of the recipient, a storage unit may be near or attached to a building, but not within it so that delivery can be made without allowing entry into the building.

The storage unit may also be temperature controlled. The storage unit may control its temperature using any of the known methods in the art. For example, the storage unit may be insulated, refrigerated, and/or heated. Thus, the storage unit may change its internal temperature to a desired temperature so that the delivery can be maintained at a required temperature to preserve the integrity of the delivery. For example, a storage unit containing dairy items may lower its internal temperature to 35 degrees Fahrenheit to prevent spoilage while a storage unit containing a cooked pizza may raise its temperature to 200 degrees Fahrenheit so that the pizza is ready for consumption upon retrieval.

The storage unit may have or receive power from a solar panel for providing power, for example, to a control system controlling the heating or refrigerating mechanism and a panel actuating mechanism. The solar panels may provide power using any known methods.

A power unit for the storage unit may have two modes of operation wherein the first mode utilizes less energy than the second mode. The first mode may be a sleeping mode so that the only power provided is that necessary to detect a power-on signal. The second mode may be activated when the power-on signal is received. In the second mode power may be provided to the heating or refrigerating mechanisms, GPS device, and/or the panel or door actuating mechanisms. The device may be in a first mode when the storage unit is empty, it may receive a power-on signal, for example, from a delivery vehicle, and transition into the second mode. After the package is retrieved from it may transition back to the first mode. Thus the storage unit may charge a battery continuously from a solar panel while expending minimal energy. The storage unit may be entirely self-powered in some embodiments.

The storage unit may also be mobile so that it can be moved around a property to maximize sun exposure. In some embodiments measures may be taken to make the storage unit less mobile to prevent theft or tampering. This may be done by securing the storage unit to a permanent structure, such as a house or tree, adding additional weight to the storage unit, or securing it to the ground.

FIG. 1 is an embodiment of a storage unit. Storage unit 100 may be a box with a door 102 that can open and close to control access to the interior of the storage unit. Door 102 may be located on the top of the storage unit so that items may be delivered from a UAV hovering above storage unit 100. Doors may also be provided, in addition to or in place of door 102, that allow access to the contents of storage unit 100 from any side of the device. For example, storage unit 100 may have a door located on side 104 to allow access to the unit by a land vehicle. Door 102 may be hinged so as to swing open or may slide horizontally to open. The door may be a single piece or may be multiple pieces that are separately coupled to the walls of storage unit 100 by separate track or hinges. Door 102 may also include one or more solar panels that provide charge to a battery. The solar panels may be on the exterior of the storage unit and may be arranged parallel to the storage unit doors or may be mobile so as to tilt with the movement of the sun. For example, a processor may detect that the solar panel's sun exposure has decreased and may control the movement of the solar panels to a position having more sun exposure.

Storage unit 100 may also include control unit 106. Control unit 106 may control the control the components of the storage unit, such as, the movement of solar panels, a door opening and closing mechanism, a heating mechanism, and/or a refrigerating mechanism. The storage unit 100 may also have a wireless connection that connects a GPS locator, a transmitter, a receiver, a display, and/or a keypad to a control unit or to other devices. In some embodiments the key pad and the display may be integrated into a single touchscreen device. Control unit 106 may also be coupled to a lock for locking door 102 after a delivery and unlocking door 102 when a code or key has been entered into the key pad or a signal has been received by an approved device. In some embodiments, a control unit may be programmable to power-on at a certain time or for a certain amount of time.

The desired temperature for the contents within storage unit 100 may be input by the recipient via a key pad or other input device located on storage unit 100 or it may be remotely programmed via a wireless connection. In other embodiments, control unit 106 may receive a signal from an incoming delivery vehicle that directs storage unit 100 to power-on and achieve a desired temperature as the delivery vehicle approaches storage unit 100. The delivery vehicle may be a UAV, an automated or manually operated land or water vehicle, or the person making deliveries. The GPS locator may communicate its location to a delivery vehicle and determine the distance of the vehicle to the storage device. This distance may be used to determine the optimal time to activate a heating or refrigerating device to avoid wasting energy heating or cooling an empty storage unit. Control unit 106 may be coupled to one or more sensors for determining the temperature inside storage unit 100 or the temperature of the contents of the storage unit. The information from the sensors may be monitored by a processor and used to control the heating or refrigerating mechanism to maintain the desired temperature within storage unit 100.

Control unit 106 may also be coupled to a sensor for determining whether the storage unit has received a package. For example, a force sensor may be used to detect a change in weight within the storage unit 100. If the weight of the storage unit or its contents increases or is above a threshold, control unit 106 may activate a heating or refrigerating mechanism. If the weight decreases or falls below a threshold, the control unit may turn off the heating or refrigerating mechanism and/or power-off. Other embodiments may include additional sensors for determining whether storage unit 100 contains a package, for example a laser sensor may determine that a package has been added or removed from storage unit 100 when a detected beam is broken.

A display may also display information about the temperature within storage unit 100 and the contents within storage unit 100. Control unit 106 may also communicate with a remote device, such as a mobile phone, to give an intended recipient notification that contents have been added or removed from storage unit 100. Control unit 106 may also receive a signal from the remote device to open, close, or lock door 102. The signal may be encoded so that only approved devices may open, close, or lock door 102. In one embodiment, an intended recipient may use an application to sync their mobile device to storage unit 100. The storage unit may be programmed to provide access to its contents only when a signal is received by a synced device.

Control unit 106 may be further coupled to an alarm responsive to attempts to access the contents of storage unit 100 if the control unit has not received the proper credentials. The alarm may be visual or audible and may include a camera for capturing the incident. The image may be stored or immediately transmitted to the mobile device of the intended recipient and/or the deliverer or retailer. In some embodiments, access to the contents of storage unit 100 may be remotely granted. This may be advantageous if the owner of storage unit 100 would like to allow another member of the household access to the contents of the box. In embodiments having a camera, a remotely located owner may receive feed from the camera to determine whether to grant access. Still further embodiments may use facial recognition or finger-print recognition to grant access to the contents of storage unit 100.

The systems and methods disclosed herein can be configured to comply with privacy requirements which may vary between jurisdictions. For example, before any recording or capturing of user biometric data, a "consent to capture" process may be implemented. In such a process, consent may be obtained, from the user, via a registration for a service. Part of the registration process may be to ensure compliance with the appropriate privacy laws for the location where the service would be performed. No unauthorized collection of biometric data of individuals occurs via exemplary systems and methods.

After registration, as part of a two factor authentication system and before performance of the service, a verification of the user as registered with the system and providing the required consents can occur. That is, the user's registration status as having consented to the collection of biometric data can be verified prior to collecting any biometric data. This verification can take place, for example, by the user entering a PIN (Personal Identification Number), password, or other code into a keypad or keyboard; by the user entering into a limited geofence location while carrying a fob, mobile device (such as a smartphone), or other RF transmitter, where the device has been configured to broadcast an authorization signal. In other configurations, and where permitted, the collection of biometric data can be affirmatively allowed by the user, such as where the user initiates a fingerprint scan, a palm scan, iris scan, etc., by orienting their body or hand in a particular way.

Once consent is verified, biometric data of the user can be captured and used, for example, as part of a two factor authentication system. If the user verification fails at any point during the two factor authentication, the camera, sensor, or other biometric data collection system is immediately turned off, and any biometric data collected from the user is immediately deleted, not having been saved to disk.

Preferably, any biometric data captured as part of the verification process is handled and stored by a single party at a single location. Where data must be transmitted to an offsite location for verification, the biometric data is encrypted. The hashing of the biometric data received is a form of asymmetrical encryption which improves both data security and privacy, as well as reducing the amount of data which needs to be communicated.

Figure 2:
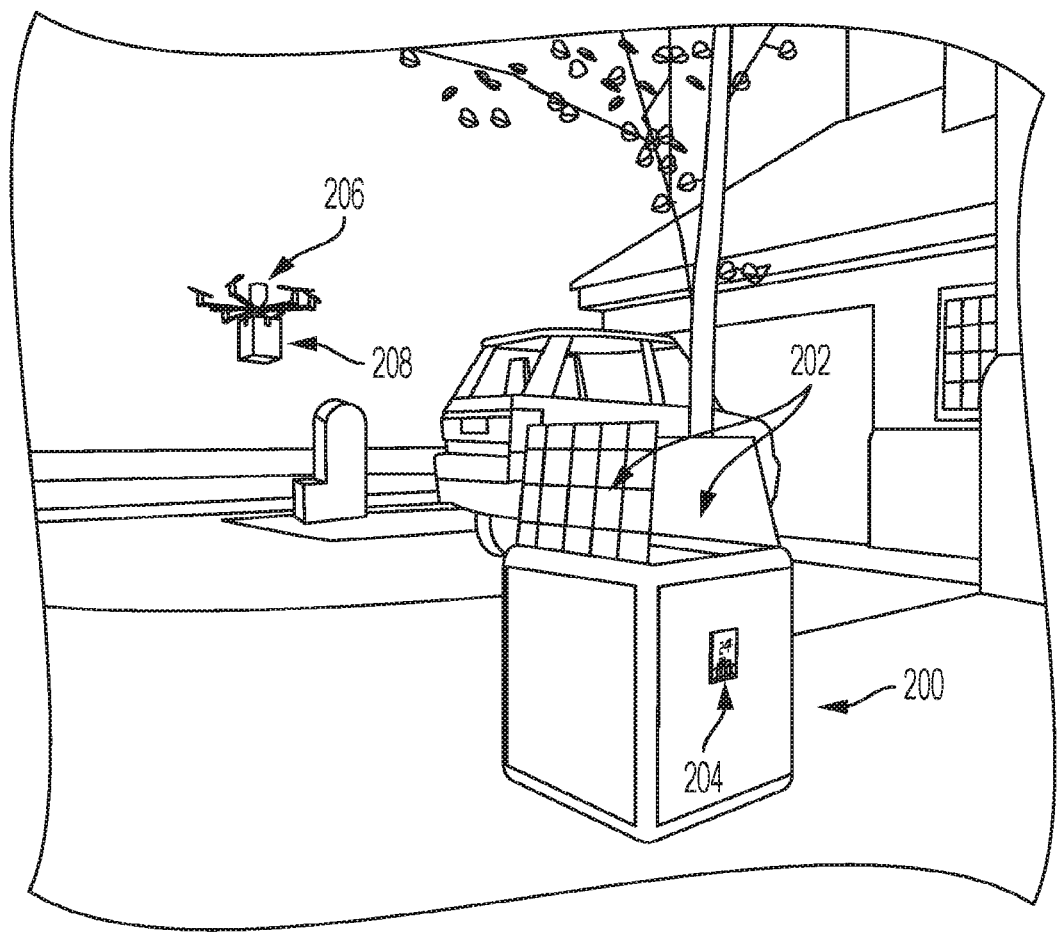
FIG. 2 is an illustration of a storage unit preparing to receive a package.

FIG. 2 is an illustration of a storage unit 200 preparing to receive a delivery. Storage unit 200 includes two doors 202 for allowing access to the interior of storage unit 200. Doors 202 may be controlled by control unit 204. Control unit 204 may receive a signal from UAV 206 indicating that it is approaching with a delivery for that storage unit. Control unit 204 may then open doors 202 so that delivery can be made. Control unit 204 may also receive a signal from UAV 206 to adjust its internal temperature to a designated degree. In other embodiments, control unit 204 may receive a first signal to adjust its internal temperature at an earlier time, this may be sent by the deliverer when the UAV leaves with a package 208 or when the UAV is within a certain distance of the storage unit 200. This may be advantageous so that storage unit 200 can stay closed until necessary to prevent tampering and for more efficient temperature control.

Figure 3:
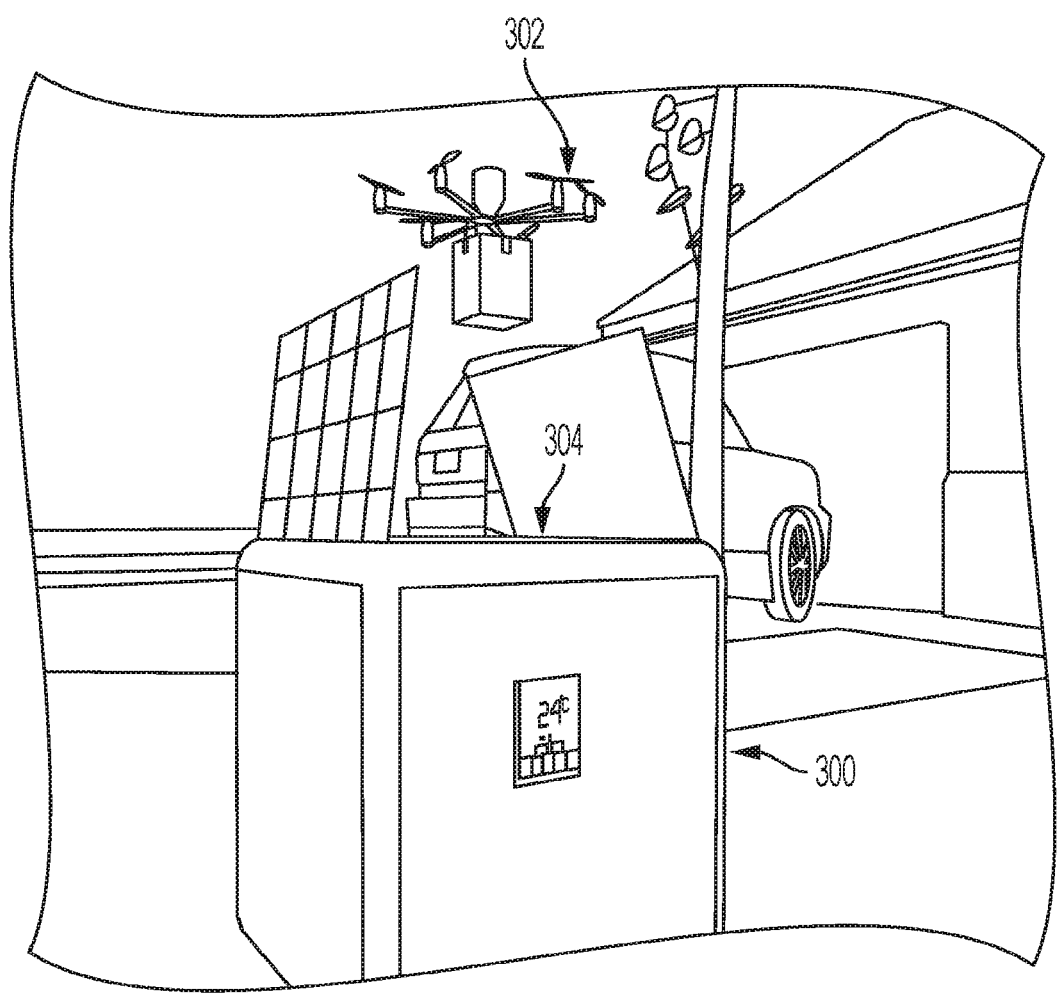
FIG. 3 is an illustration of a storage unit preparing to receive a package.

FIG. 3 is an illustration of a UAV aligning with a storage unit for delivery of a package. The UAV 302 may communicate with storage unit 300 to align with opening 304 for delivery. UAV 302 and storage unit 300 may use a GPS locator to locate storage unit 300. Additional sensors may be used to align the UAV with opening 304. For example, a camera may be used to align the UAV directly above opening 304 of storage unit 300. Storage unit 300 may also emit a signal that is received by the UAV to help with alignment. The UAV may lower in altitude as it approaches storage unit 300 to a desired dropping distance.

Figure 4:
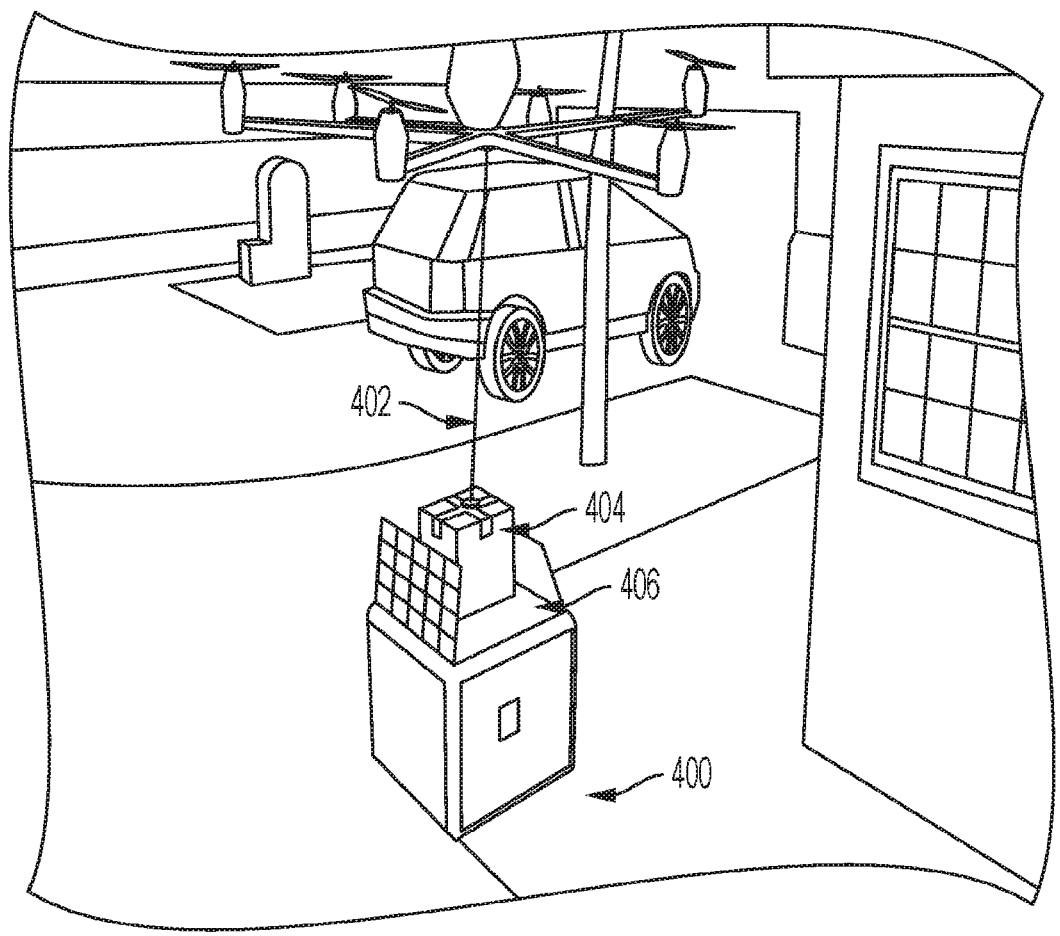
FIG. 4 illustrates an embodiment of a storage unit receiving a package.

FIG. 4 illustrates a UAV lowering package 404 into the opening 406 of storage unit 400. In some embodiments, a package 404 may be connected to the UAV by a retractable cord. In these embodiments, the cord may lower the package when the UAV has aligned with the opening of storage unit 400 and lowered to desired dropping distance above storage unit 400. The dropping distance may be determined based on the fragility of the contents of the package or hazards in the area. In some embodiments, the cord 402 may lower the package 404 into storage unit 400. In other embodiments, package 404 may be dropped from a distance above the opening of storage unit 400.

Some embodiments may have a device to absorb the impact of the drop on the package. In some embodiments, a cushioning layer may line the bottom of storage unit 400. The cushioning layer may include packing materials, such as air-filled plastic pillows packing peanuts, or traditional pillows. In other embodiments, a soft-sided bag may be suspended within storage unit 400 to catch the package 404.

After the package is released, storage unit 400 may detect that contents have been delivered. In some embodiments, a signal may be sent by the I-JAV indicating that the package has been delivered, other embodiments may have a sensor for detecting contents. After storage unit 400 determines that the contents have been added, it may close the doors of storage unit 400. Additionally, when storage unit 400 determines that a package has been delivered, it may send a notification, such as a message to a mobile phone, to a recipient that a package has arrived. It may additionally or alternatively change a display or turn on a lamp to indicate that storage unit 400 contains a package.

Figure 5:
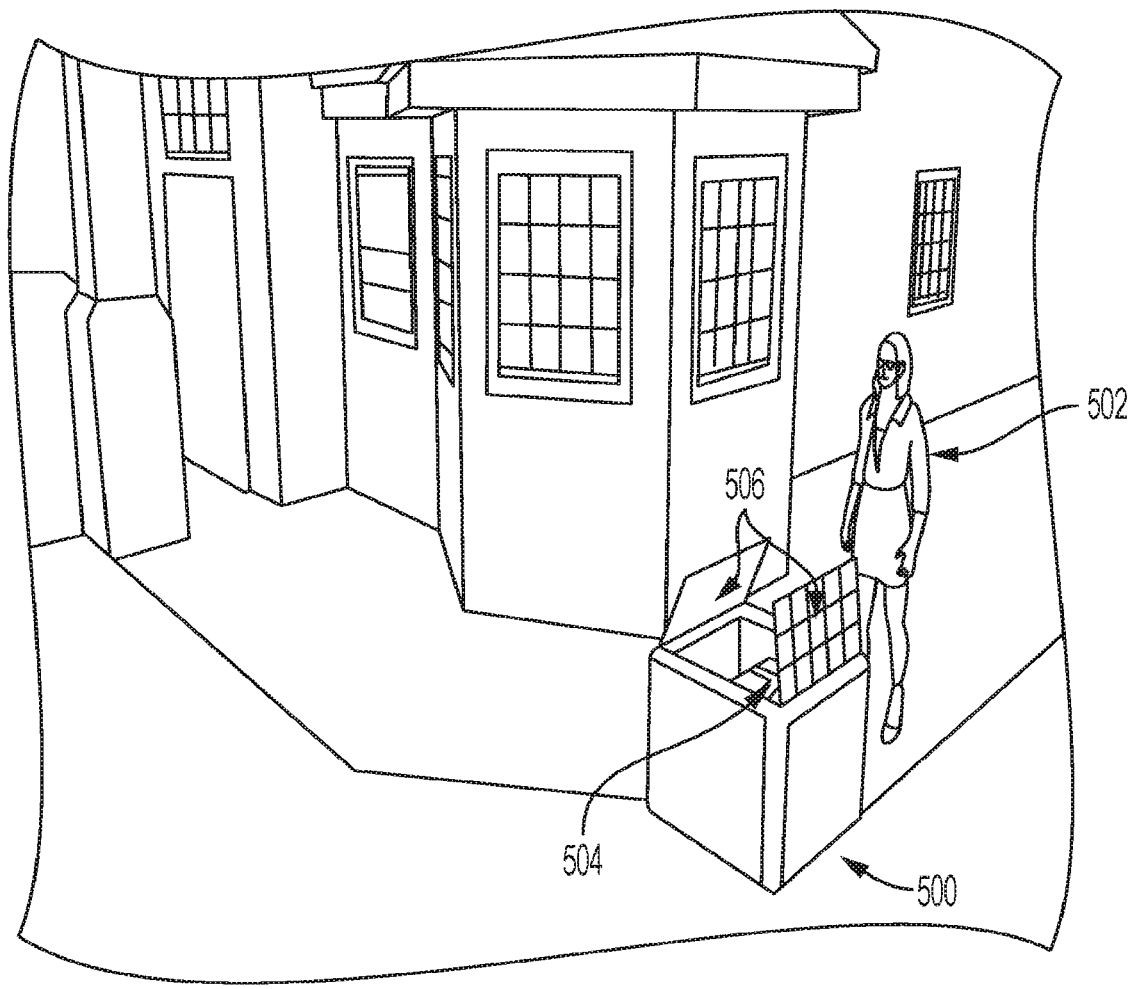
FIG. 5 illustrates an embodiment of a storage unit preparing for package retrieval.

FIG. 5 depicts a recipient 502 retrieving a package 504 from storage unit 500. The recipient 502 may have been away at the time of delivery or may be prompted to retrieve package 504 via a notification. The control unit of storage unit 500 may receive a signal from recipient 502 mobile phone. The signal may include a code identifying the recipient. If the control unit determines that the recipient is sending the signal it may open doors 506 to allow recipient 502 to retrieve the package. In other embodiments the doors may be secured by a locking mechanism which may be unlocked when the recipient signal is received. In other embodiments the recipient may be identified by physical feature recognition devices such as a facial recognition device or a finger-print device that identifies one or more approved recipients.

The approved recipients may be pre-programmed by the owner of storage unit 500 and may be changed based on the contents of the package or the owner's request. The approved recipients may be determined using the methods disclosed herein in compliance with the privacy requirements of a jurisdiction. For example, an owner may program storage unit 500 to open for a member of the household if a delivery is groceries but not if the delivery is, for example, a gift for the family member. Or the owner may program storage unit 500 to open for a child when a delivery is made by a restaurant but not when a delivery is made from a liquor store. Further, a storage unit may be shared by a number of residents of an apartment building. In these embodiments, the intended recipient may be limited to the person who purchased the product and the control unit may receive a signal from the UAV or scan a code on the package that indicates the intended recipient.

The recipient 502 may remove the package 504 from the storage unit 500. If the control unit detects that the package has been removed, it may close the doors of storage unit 500 and may optionally activate a lock. In some embodiments the storage unit 500 may include sensors that determine whether the package has been removed or may determine the package has been removed when the recipient accesses the unit. In other embodiment a person could indicate that the package has been removed or instruct the storage unit to power-off and/or lock via a cell phone or input device on the storage unit. If the package has been removed, the control unit may power-off the main energy unit of storage unit 500

If the package is removed or there is no longer a need to keep the interior of storage unit 500 at a certain temperature, the heating or refrigerating mechanism may be turned off and the storage unit may enter a sleeping mode. The solar panels, or other charging mechanism, may continue to charge the battery while in this mode. The solar panel may deliver direct current to an inverter which may convert the direct current to alternating current which is then used to charge a battery. The battery may then be used to provide power for the storage unit 500. While in the sleeping mode, the storage unit may be able to move autonomously to optimize exposure to the sun. In some embodiments the control unit may control wheels on the storage unit to move the storage unit to the location with the most exposure throughout the day. In other embodiments, the location of the storage unit may be a predetermined path that may be manually entered into the control unit. In still further embodiments, the control unit may receive a signal from an individual and allow the individual to control the movement of the storage unit via the wheels using a wireless device.

Figure 6:
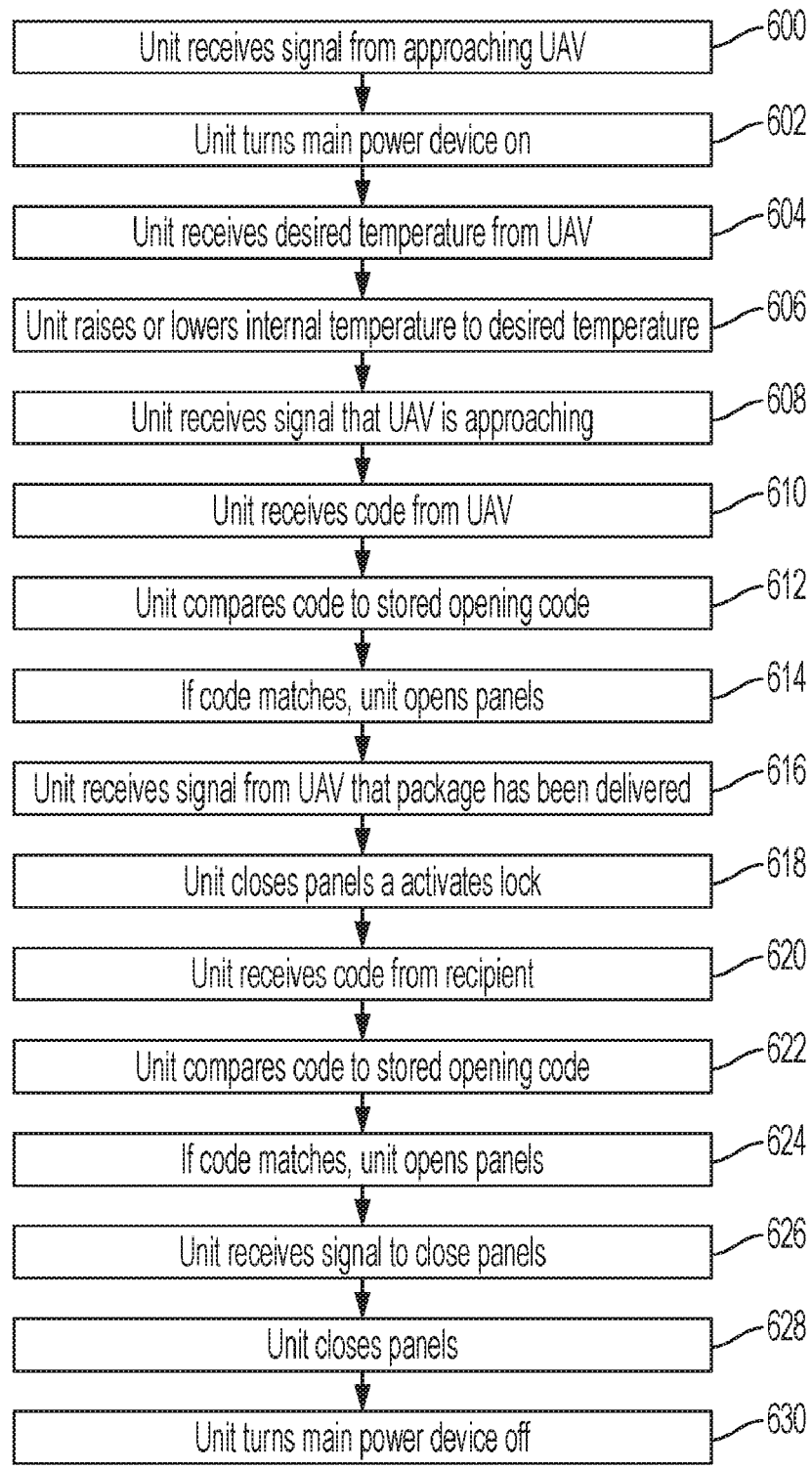
FIG. 6 illustrates an example process flow chart.

FIG. 6 is an example process flow chart. At 600 a storage unit may receive a signal that a UAV is delivering a package to the storage unit. The storage unit may be in a sleeping mode so that functionalities that are not necessary for receiving and processing the incoming signal are not operating. The signal may be sent by a UAV or by the person or entity sending the package. Some embodiments may utilize a geo-fence to inhibit the UAV from entering designated areas. If an incoming delivery signal is received, the storage unit may turn on the main power unit powering additional functionalities of the device. For example, a heating, refrigerating, or GPS locator may be powered on at 602. At 604, the storage unit receives a signal with a desired temperature. At 606 the storage unit activates a heating or refrigerating mechanism in the storage unit. The unit may monitor the temperature within the storage unit to determine when the desired temperature is achieved and maintain the temperature within the interior of the storage unit. In some embodiments the storage unit will determine the amount of time necessary to achieve the desired temperature and will activate the heating or refrigerating mechanism only when necessary to achieve the desired temperature by the time the UAV arrives. At 608 the storage unit receives a signal that the UAV is approaching the storage unit.

At 610, a code may be sent to the storage unit with an access code. The access code may be specific to the storage unit and act as a key for opening or unlocking the storage unit. At 612, the storage unit compares the code to the code for the storage unit, if the code matches, the storage unit may open doors on the storage unit allowing access to the interior at 614. At 616, the storage unit determines that a package has been delivered. In some embodiments, a sensor may determine that the package has been delivered or the UAV may send a signal that the package has been delivered. At 618 the doors of the storage unit may close and a lock may be activated. At 620, the storage unit receives a code from a recipient. The code may be from a mobile device that is unique to the user device or to the storage unit. In other embodiments the code may be entered by a recipient into a key pad located on the device. The received code may be compared to one or more stored codes for authorized recipients at 622. If the code is correct, the storage unit may open doors allowing access to the package at 624

Figure 7:
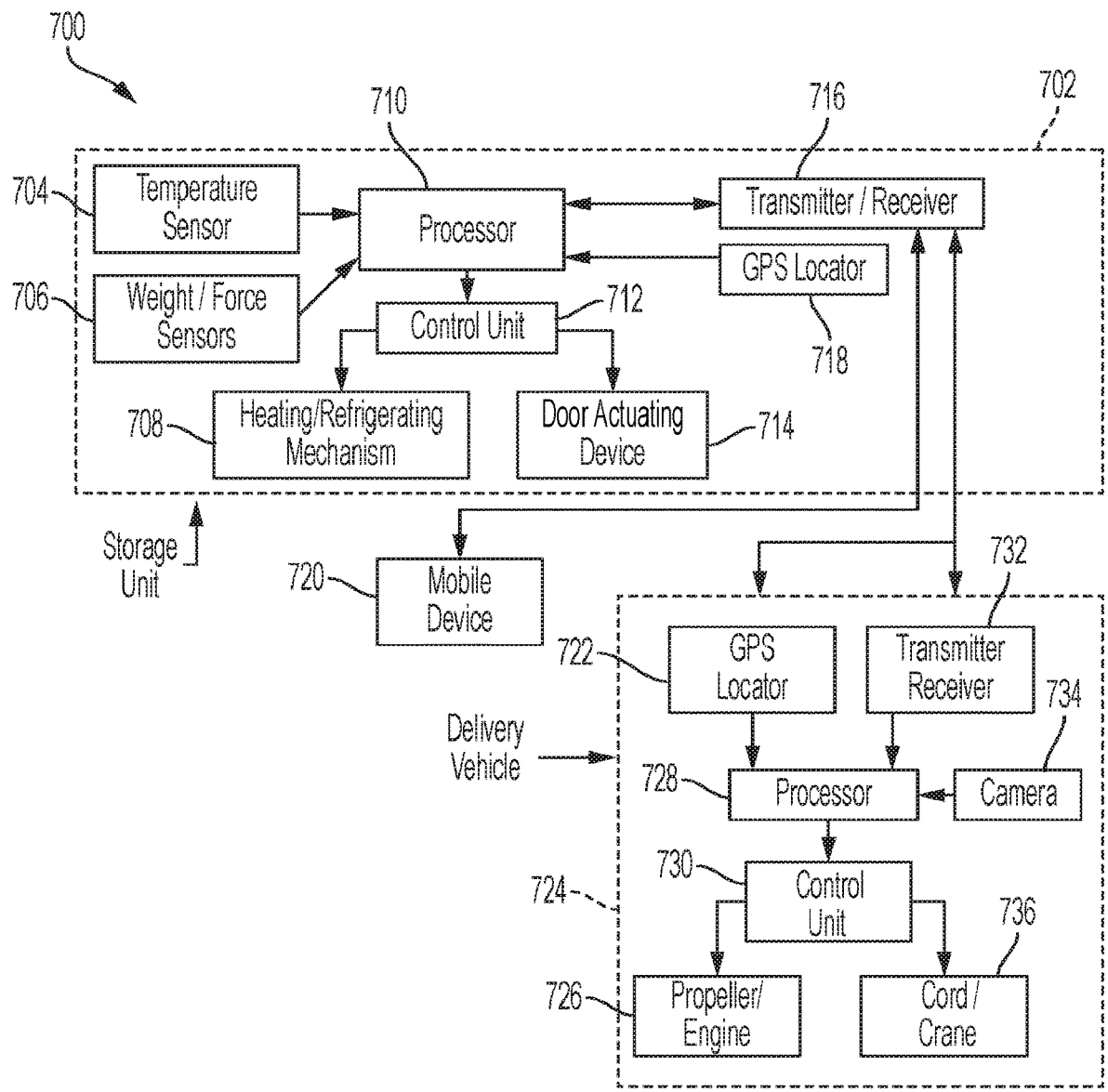
FIG. 7 is a block diagram of an embodiment.

At 626 the unit receives a signal indicating that the package has been retrieved. The signal may be from sensors for sensing the presence of a package or sent by the recipient. At 628 the door closes and may optionally activate a lock. In some embodiments the recipient may close the door or activate the lock manually or by pressing a button or entering a code At 630 the additional functionalities activated at 602 may be deactivated and the storage unit may enter a sleeping mode FIG. 7 is a block diagram of embodiment 700. The storage unit 702 may have a storage unit processor 710 that receives information from a temperature sensor 704 and a weight or force sensor 706. It may further receive or transmit information to a storage unit transmitter or receiver 716. It may also receive information from a storage unit GPS locator 718. The storage unit processor 710 may send instructions to a storage unit control unit 712. The storage unit control unit 712 may then send commands to a heating or refrigerating mechanism 708 and a door actuating device 714.

The storage unit transmitter and receiver 716 may exchange information with the delivery vehicle transmitter and receiver 732. A delivery vehicle processor 728 may receive input from delivery vehicle transmitter and receiver 732, camera 734, delivery vehicle GPS locator 722, and/or other sensors. Delivery vehicle processor 728 may then send instructions to delivery vehicle control unit 730 that controls a propeller or engine 726. In some embodiments, delivery vehicle processor 728 may send instructions to other navigation controlling devices and may control the cord or crane of the delivery vehicle if the delivery vehicle is a UAV.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A storage unit, comprising:
   a container defining an interior storage space and an opening configured to provide access to the interior storage space;
   a door configured to open and close the opening;
   a heating/cooling mechanism configured to adjust a temperature in the interior storage space;
   a temperature sensor configured to monitor the temperature in the interior storage space; and
   a control unit configured to:
      receive the temperature in the interior storage space;
      receive a required temperature of an item in the storage unit;
      receive a signal indicative of a distance of a delivery vehicle; and
      activate the heating/cooling mechanism based on the temperature, the required temperature, and the distance of the delivery vehicle, wherein the heating/cooling mechanism is activated at a time configured to achieve the required temperature within the interior storage space when the delivery vehicle arrives at the storage unit.

2. The storage unit of claim 1, wherein the door is secured by a lock that is responsive to an intended recipient corresponding with a recipient code.

3. The storage unit of claim 1, wherein the door is located on top of the storage unit and the interior storage space is accessible from above.

4. The storage unit of claim 1, wherein the delivery vehicle is an unmanned aerial vehicle.

5. The storage unit of claim 1, wherein the temperature controller is activated in response to delivery of a package and deactivated in response to retrieval of a package.

6. The storage unit of claim 1, wherein the code is sent by a mobile device.

7. The storage unit of claim 1, further comprising a GPS locator communicatively coupled to the delivery vehicle.

8. The storage unit if claim 1, further comprising a display that displays information about contents within the storage unit and a key pad that receives a code.

9. A method, comprising:
   receiving, by a control unit, a temperature of an interior storage space of a storage unit;
   receiving, by the control unit, a required temperature of an item to be located in the storage unit;
   receiving, by the control unit, a signal indicative of a distance of a delivery vehicle carrying the item; and
   activating a heating or refrigeration mechanism based on the temperature, the required temperature, and the distance of the delivery vehicle, wherein the heating or refrigeration mechanism is activated at a time configured to achieve the required temperature within the interior storage space when the delivery vehicle arrives at the storage unit.

10. The method of claim 9, comprising:
    opening the storage unit when the delivery vehicle is within a threshold proximity of the storage unit; and
    closing the storage unit when the item has been delivered within the interior storage space.

11. The method of claim 9, comprising opening the storage unit in response to input from an intended user of the item.

12. The method of claim 11, wherein the input from the intended user of the item comprises biometric data.

13. The method of claim 11, wherein the input from the intended user of the item comprises a recipient code.

14. The method of claim 9, comprising deactivating the heating or refrigeration mechanism in response to retrieval of the item.

15. A system, comprising:
    at least one unmanned aerial vehicle (UAV) configured to deliver one or more items to one or more locations;
    a storage unit at a first location configured to receive at least one of the one or more items; and
    a control unit, configured to:
       determine a distance of the UAV to the storage unit;
       activate a temperature control mechanism based on the distance of the UAV to the storage unit, wherein the temperature control mechanism is activated at a time configured to achieve a predetermined temperature within the interior storage space when the UAV arrives at the storage unit; and
       provide access to the storage unit in response to input from an intended recipient.

16. The system of claim 15, wherein the control unit is configured to:
    open a door of the storage unit when the UAV is within a threshold proximity of the storage unit; and
    close the door of the storage unit when the at least one of the one or more items is delivered to the storage unit.

17. The system of claim 16, wherein the storage unit has a cushioning layer that absorbs an impact of the at least one of the one or more items being delivered to the storage unit.

18. The system of claim 15, wherein the input from the intended recipient comprises a recipient code.

19. The system of claim 15, wherein the input from the intended recipient comprises biometric data.

20. The system of claim 15, wherein the intended recipient is one of a plurality of intended recipients.

* * * * *